United States Patent
Kim et al.

(10) Patent No.: US 9,641,658 B2
(45) Date of Patent: May 2, 2017

(54) MOBILE TERMINAL COMPRISING EDGE MOUNTED LCD DISPLAY MODULE AND WINDOW

(71) Applicant: LG Electronics Inc., Seoul (KR)

(72) Inventors: Sungpil Kim, Seoul (KR); Youngdo Cha, Seoul (KR); Bohyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/195,488

(22) Filed: Jun. 28, 2016

(65) Prior Publication Data

US 2017/0070601 A1  Mar. 9, 2017

(30) Foreign Application Priority Data

Sep. 3, 2015  (KR) .................. 10-2015-0125062

(51) Int. Cl.
*H04M 1/02* (2006.01)
*G09F 9/00* (2006.01)
*H04B 1/38* (2015.01)

(52) U.S. Cl.
CPC ...... *H04M 1/0266* (2013.01); *H04M 2201/38* (2013.01)

(58) Field of Classification Search
CPC ........ H04M 1/02; H04M 1/0266; H04B 1/38; G09F 9/00
See application file for complete search history.

(56) References Cited

U.S. PATENT DOCUMENTS

| | | | |
|---|---|---|---|
| 8,947,865 B2* | 2/2015 | Matsuda ............. | H04M 1/0266 349/58 |
| 8,977,329 B1* | 3/2015 | Arao .................. | H04M 1/0266 361/776 |
| 9,002,419 B2* | 4/2015 | Satou ..................... | G06F 3/044 455/128 |
| 9,282,668 B2* | 3/2016 | Cheng ...................... | H05K 7/06 |
| 2007/0065091 A1 | 3/2007 | Hinata et al. | |
| 2011/0076434 A1* | 3/2011 | Cho .................... | B29C 65/3644 428/38 |
| 2013/0141665 A1 | 6/2013 | Huang et al. | |
| 2014/0256207 A1 | 9/2014 | Toyoda et al. | |

FOREIGN PATENT DOCUMENTS

JP  2007214737 A  *  8/2007  .............. H04M 1/02

* cited by examiner

*Primary Examiner* — Blane Jackson
(74) *Attorney, Agent, or Firm* — Birch, Stewart, Kolasch & Birch, LLP

(57) ABSTRACT

A mobile terminal is provided. The mobile terminal includes: a display unit having a window, and an LCD module provided below the window; a first case spaced from the display unit and configured to support the display unit; and an edge member disposed between the display unit and the first case, and formed along an edge of the display unit, wherein the window is formed to have a smaller size than the LCD module in a first direction, such that at least part of the edge member contacts a side surface of the window, an upper surface of the LCD module, and an inner side surface of the first case.

20 Claims, 19 Drawing Sheets

MOBILE TERMINAL COMPRISING EDGE MOUNTED LCD DISPLAY MODULE AND WINDOW

CROSS-REFERENCE TO RELATED APPLICATION

Pursuant to 35 U.S.C. §119(a), this application claims the benefit of earlier filing date and right of priority to Korean Application No. 10-2015-0125062, filed on Sep. 3, 2015, the contents of which is incorporated by reference herein in its entirety.

BACKGROUND OF THE INVENTION

1. Field of the Invention

The present invention relates to a mobile terminal, and more particularly, to a mobile terminal having a display unit of a larger area.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

FIG. 2A is a partial sectional view of a mobile terminal in accordance with the conventional art, and FIG. 2B is a rear view of a window in accordance with the conventional art.

As shown in FIG. 2A, in the conventional art, a printed region 13 for preventing light generated from an LCD module 151b from leaking to the outside is formed on a rear surface of an edge region of a window 151a. And the edge region of the window 151a is mounted to a case 10. The edge region of the window 151a includes not only the printed region 13, but also an adhering member 15 for adhering to an LCD module 151b provided below the window 151a to the case 10. That is, an adhering member 14 having an approximate quadrangular shape for adhering the LCD module 151b to the case 10 is formed on a rear surface of the window 151a.

The printed region 13 not only serves to cover a lower structure of the window 151a, but also serves as a light shielding member for preventing light generated from the LCD module 151b from leaking to the outside. In this case, the adhering member 14 is provided between the printed region 13 and the case 10, thereby fixing the window 151a to the case 10. Further, the adhering member 14 prevents light generated from the LCD module 151b from leaking to the outside through a gap between the case 10 and the window 151a.

However, such a structure has a limitation in reducing a bezel portion due to a printing on the rear surface of the window, and due to an adhering structure on the edge of the window.

SUMMARY OF THE INVENTION

Therefore, an aspect of the detailed description is to provide a mobile terminal capable of reducing a size of a bezel portion by forming a rubber member between a window and a case.

To achieve these and other advantages and in accordance with the purpose of this specification, as embodied and broadly described herein, there is provided a mobile terminal, including: a display unit having a window, and an LCD module provided below the window; a first case spaced from the display unit and configured to support the display unit; and an edge member disposed between the display unit and the first case, and formed along an edge of the display unit, wherein the window is formed to have a smaller size than the LCD module in a first direction, such that at least part of the edge member contacts a side surface of the window, an upper surface of the LCD module, and an inner side surface of the first case.

In an embodiment of the present invention, the edge member may include: a rubber member disposed between the window and the first case, and exposed to the outside; and a metallic member having one end inserted into the rubber member, and another end contacting the inner side surface of the first case.

In an embodiment of the present invention, a plurality of hooks may be protruded from the inner side surface of the first case at preset intervals, toward the inside of the mobile terminal. The metallic member may include locking portions locked by the hooks may be formed at a position corresponding to the hooks.

In an embodiment of the present invention, the hook may include: an inclination portion downward inclined from the inner side surface of the first case, and a horizontal portion extending from the inclination portion and perpendicular to the inner side surface of the first case. The locking portion may be extended from the metallic member, and may be provided with a through hole.

In an embodiment of the present invention, the mobile terminal may further include a second case covering a rear surface of the display unit and at least partially provided in the first case. Ribs may be protruded from an edge of the second case at a position facing the hooks, toward a front surface of the mobile terminal.

In an embodiment of the present invention, the first case may include a recessed portion recessed towards the inside of the mobile terminal at a middle region of the first case. The window may be attached to an upper portion and a lower portion of the recessed portion by an adhering member.

In an embodiment of the present invention, a printed region may be formed on a rear surface of the window, in correspondence to the adhering member.

In an embodiment of the present invention, a chamfer may be formed at an edge of the window, and light shielding members may be provided between the LCD module and an upper portion of the first case, and between the LCD module and a lower portion of the first case.

In an embodiment of the present invention, the light shielding member may be a pad printed onto the chamfer of the window which contacts the display unit.

In an embodiment of the present invention, the light shielding member may be a light shielding pad or a light shielding sheet protruded more than the chamfer.

In an embodiment of the present invention, the metallic member may have an approximate 'L' shape, and may include: a horizontal portion inserted into the rubber member, and horizontally formed between the window and the first case; and a vertical portion formed to be perpendicular to the horizontal portion and contacting an inner side surface of the first case.

In an embodiment of the present invention, the first case may be provided with a guide formed toward the inside of the metallic member in the first direction, and formed to be inclined to the outside in a direction of the metallic member.

In an embodiment of the present invention, the rubber member may be formed to enclose both the horizontal portion and the vertical portion of the metallic member, and may contact the inner side surface of the first case.

The mobile terminal according to the present invention may have the following advantages.

First, in at least one of embodiments of the present invention, a bezel portion may be reduced by forming the rubber member, without a printing on the rear surface of the window and an adhering structure to the case.

Second, in at least one of embodiments of the present invention, as the bezel portion is reduced, a screen ratio may be increased, and a freedom degree of design of the edge of the window may be enhanced.

Third, in at least one of embodiments of the present invention, since a waterproofing structure is replaced by the rubber member, an additional waterproofing gasket may not be required.

Fourth, in at least one of embodiments of the present invention, since the edge of the window is enclosed by the rubber member, a stress of the window may be reduced. Further, since an adhering structure of the edge of the window is omitted, the material cost may be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
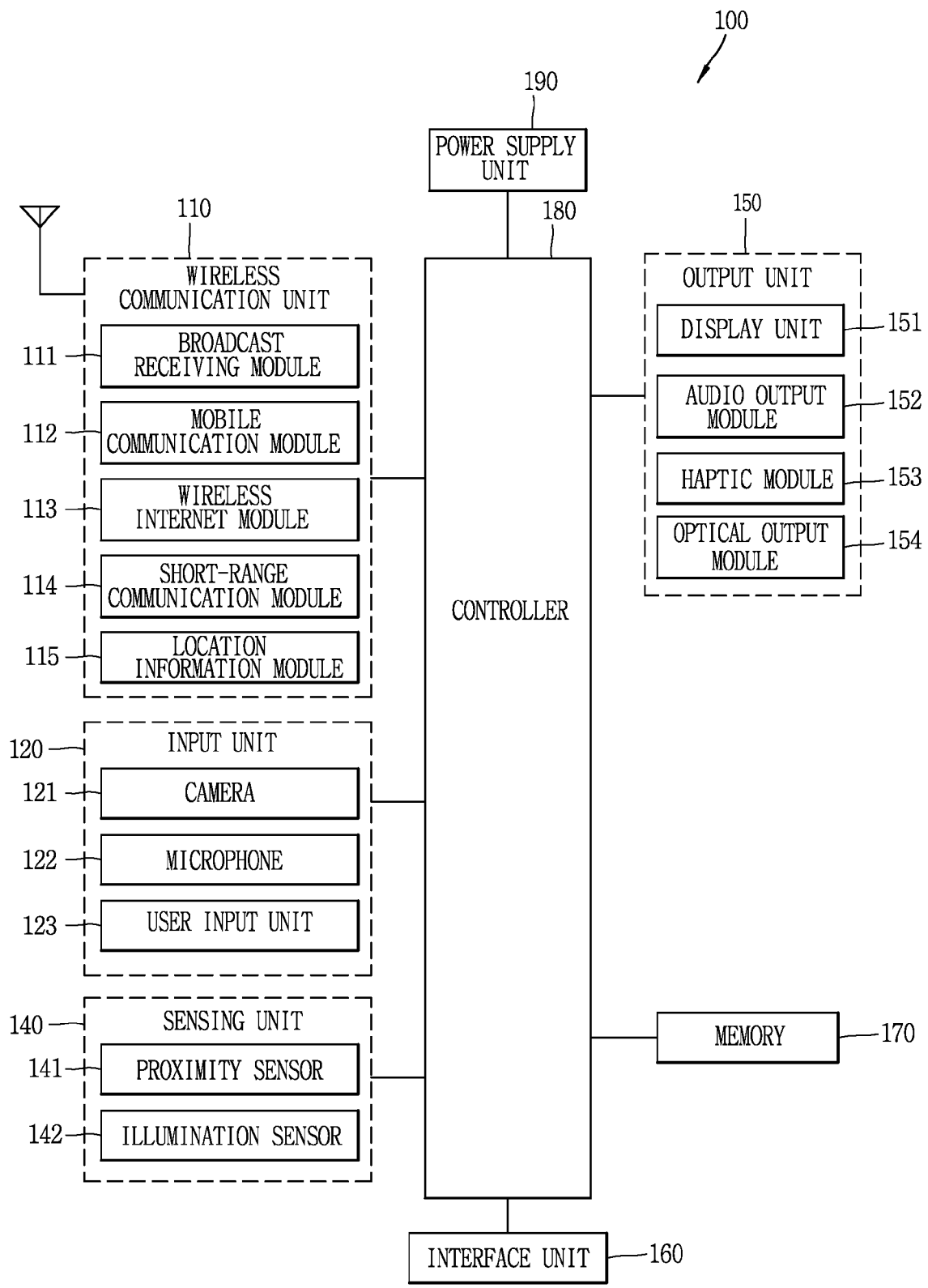
FIG. 1A is a block diagram of a mobile terminal according to the present invention.
Figure 1B:
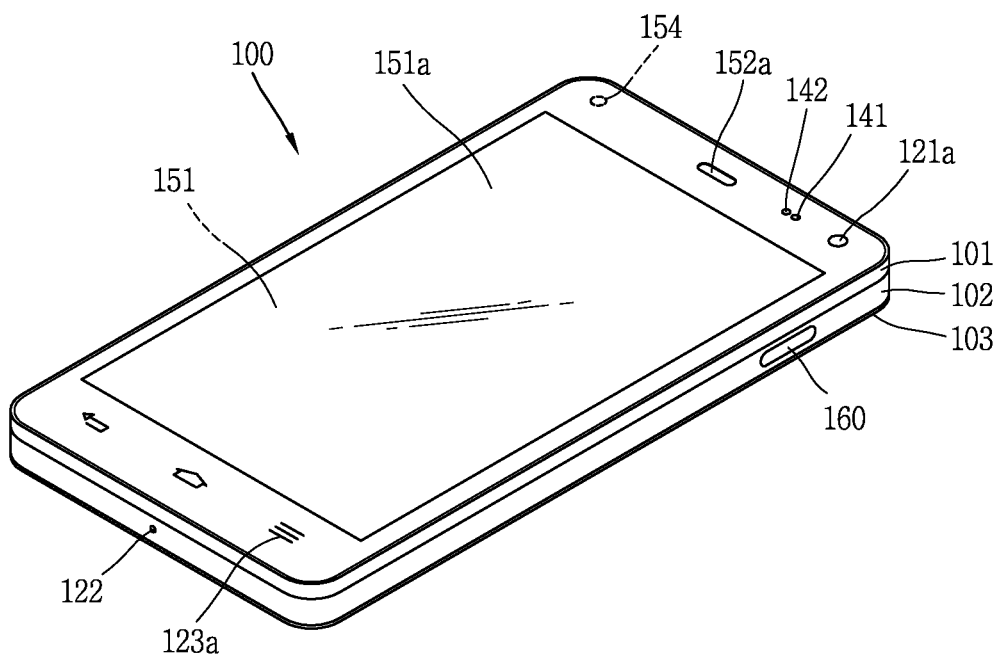
FIGS. 1B and 1C are conceptual views of a mobile terminal of the present invention, which are viewed from different directions.
Figure 1C:
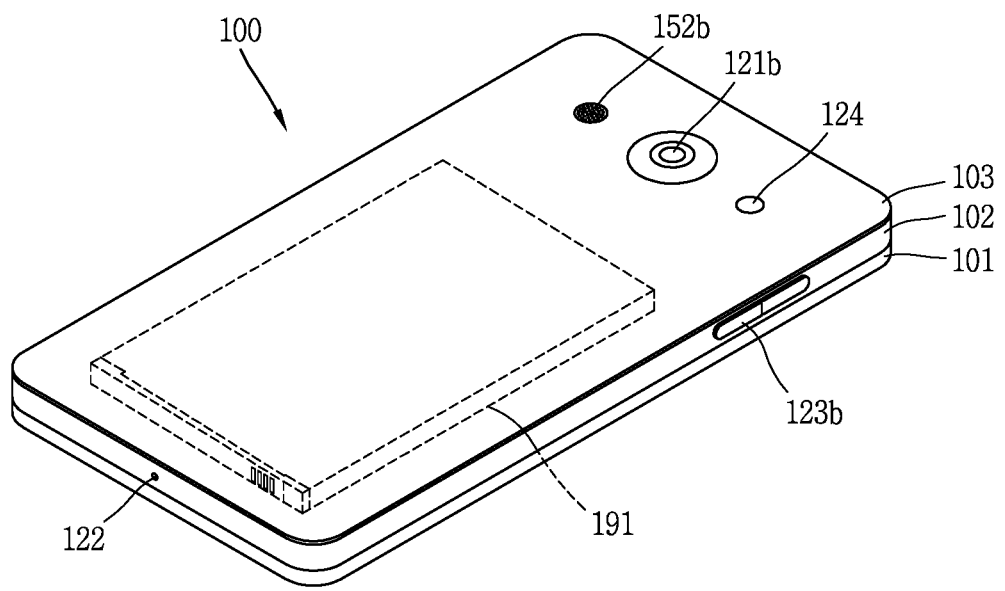

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a BLUETOOTH™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In an embodiment of the present invention, a rubber member 131 is formed between the display unit 151 and the case, or between the display unit 151 and the terminal body 104, in order to reduce a bezel portion of the mobile terminal 100.

Figure 3:
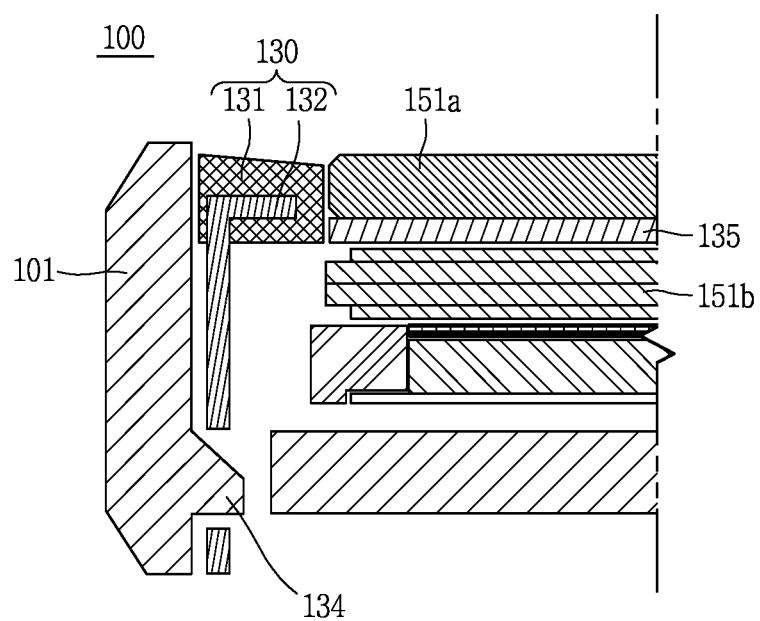
FIG. 3 is a partial sectional view of a mobile terminal according to an embodiment of the present invention.
Figure 4:
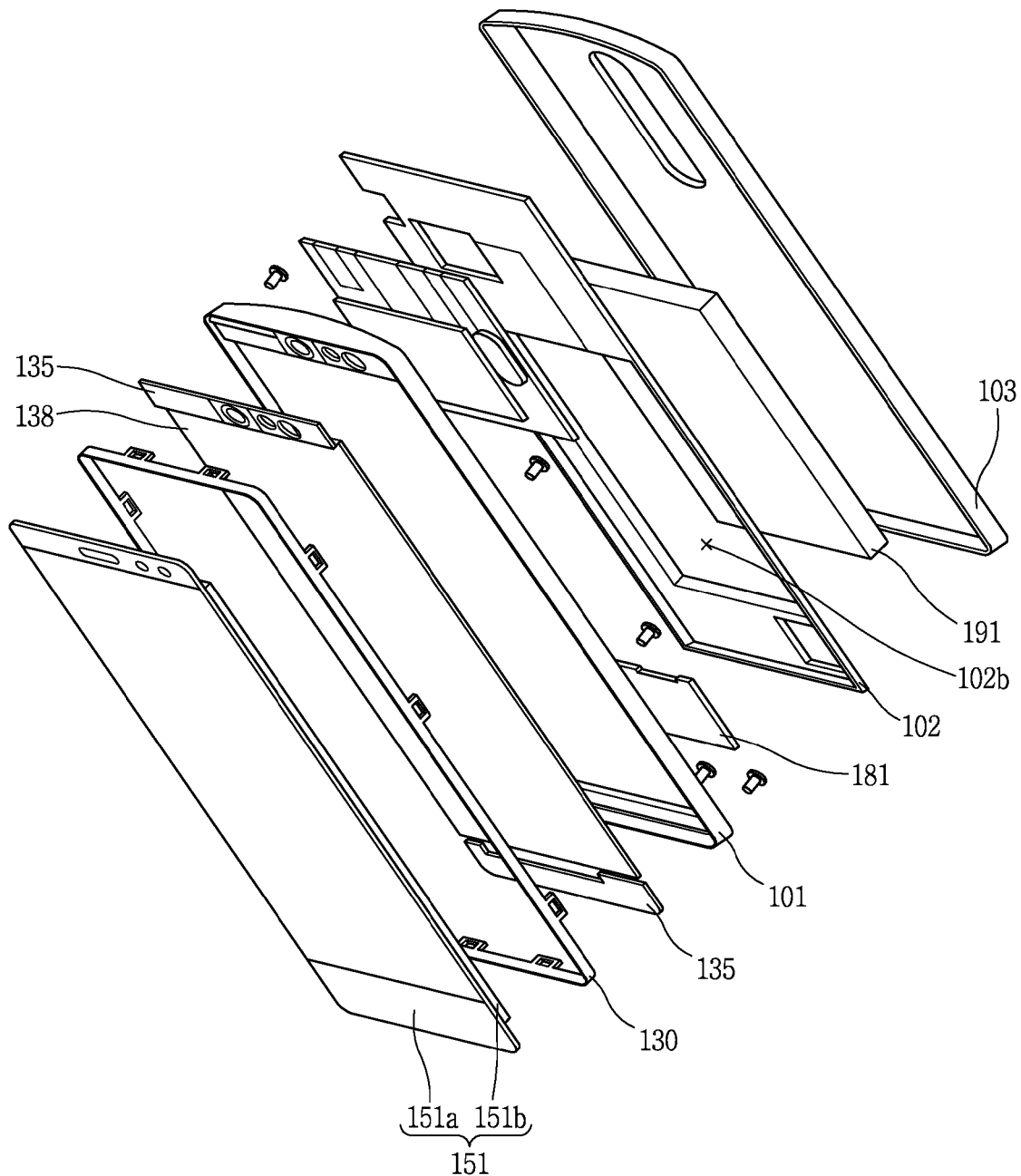
FIG. 4 is an exploded perspective view of a mobile terminal according to an embodiment of the present invention.
Figure 5:
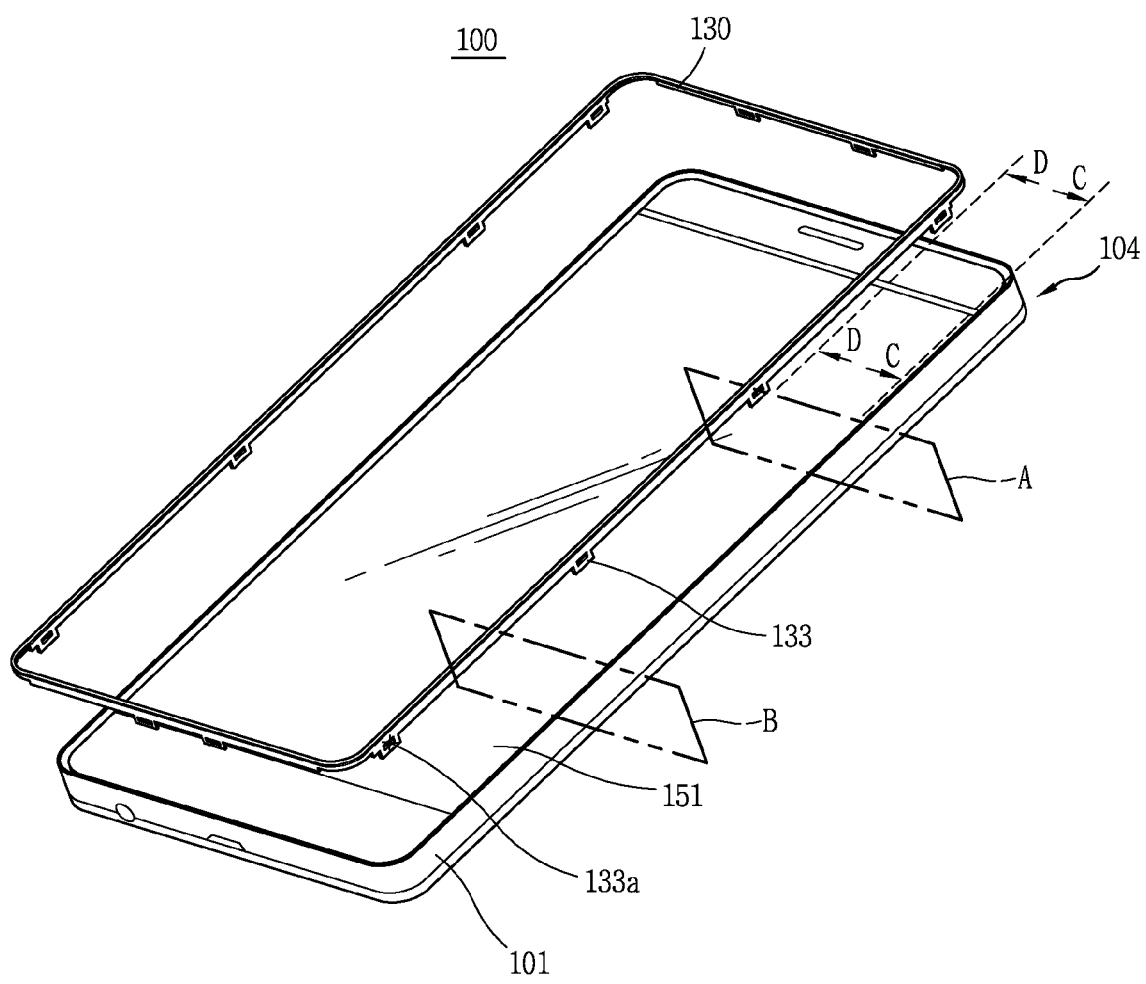
FIG. 5 is a perspective view of a mobile terminal in a separated state of an edge member according to an embodiment of the present invention.
Figure 6:
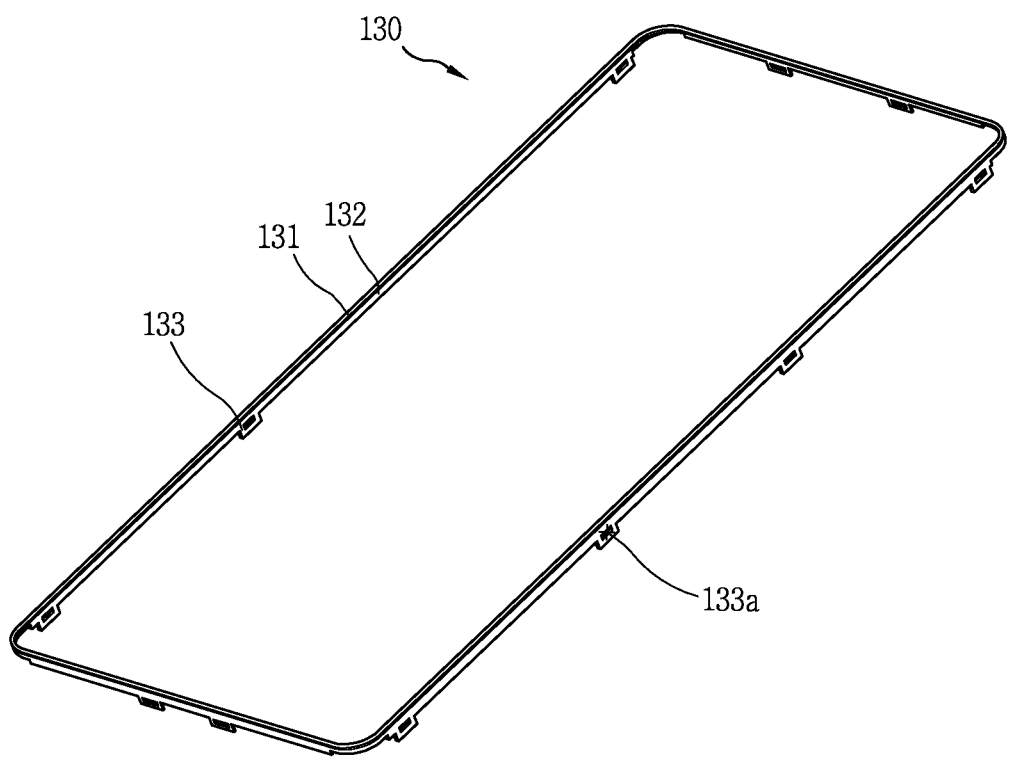
FIG. 6 is a perspective view of an edge member according to an embodiment of the present invention.

FIG. 3 is a partial sectional view of the mobile terminal 100 according to an embodiment of the present invention. FIG. 4 is a partial perspective view of the mobile terminal 100 according to an embodiment of the present invention. FIG. 5 is a perspective view of the mobile terminal 100 in a separated state of an edge member 130 according to an embodiment of the present invention. FIG. 6 is a perspective view of the edge member 130 according to an embodiment of the present invention.

Referring to FIGS. 3 to 6, the mobile terminal 100 according to an embodiment of the present invention includes a display unit 151 having a window 151a and an LCD module 151b disposed below the window 151a, a first case 101 spaced from a side surface of the display unit 151 and configured to support the display unit 151, and an edge member 130 disposed between the display unit 151 and the first case 101 and formed along an edge of the display unit 151.

Hereinafter, the front case 101, the rear case 102 and the rear cover 103 shown in FIGS. 1B and 1C will be referred to as the first case 101, the second case 102, and the third case 103, respectively. A first direction means a widthwise direction of the mobile terminal 100, but the present invention is not limited to this. That is, the first direction may mean a lengthwise direction of the mobile terminal 100. A second direction means a direction crossing the first direction. Hereinafter, it will be understood that the second direction means a direction perpendicular to the first direction. And a front surface of the mobile terminal 100 means a region where the window 151a is formed, and a rear surface of the mobile terminal 100 means a region where the third case 103 is formed.

The window 151a is formed to have a smaller size than the LCD module 151b in the first direction. Thus, when viewed from the front surface of the mobile terminal 100, the LCD module 151b may be protruded from two side surfaces of the window 151a. However, in the second direction, the window 151a is formed to have a larger size than the LCD module 151b. Thus, in the second direction, the LCD module 151b is not protruded from the window 151a.

Figure 2A:
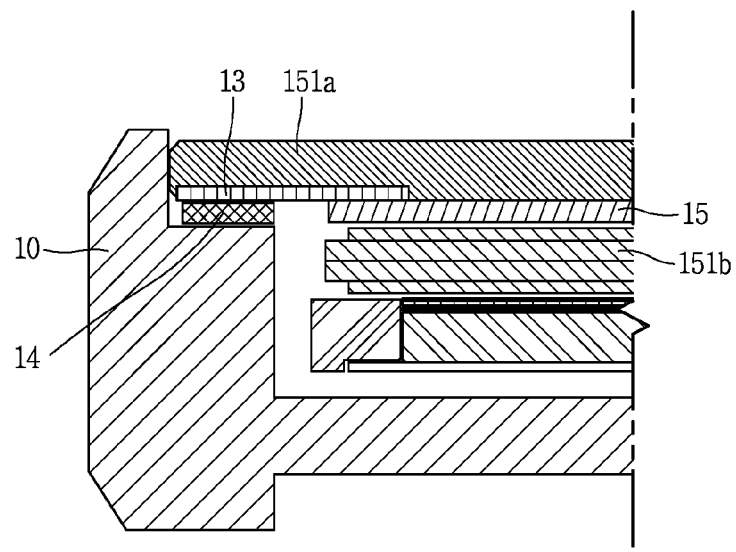
FIG. 2A is a partial sectional view of a mobile terminal in accordance with the conventional art.
Figure 2B:
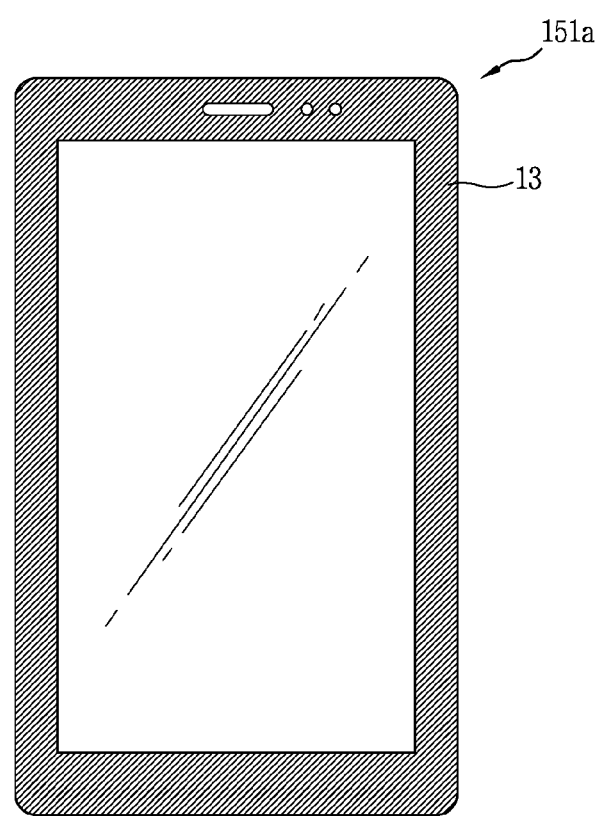
FIG. 2B is a rear view of a window in accordance with the conventional art.

In this embodiment of the present invention, as shown in FIGS. 3 and 4, since the LCD module 151b has a larger size than the window 151a, at least part of the edge member 130 contacts a side surface of the window 151a, an upper surface of the LCD module 151b, and an inner side surface of the first case 101. Unlike in FIG. 2A, the inner side surface of the first case 101 is not provided with a region to mount the as window 151a therein. That is, the window 151a is mounted only onto the LCD module 151b, and does not contact the first case 101.

The window 151a and the LCD module 151b are adhered to each other by an adhering member 135. The adhering member 135 may be a double-sided tape, but is not limited to this. That is, the window 151a and the LCD module 151b may be adhered to each other by an adhesive, etc. in a bonding manner.

As shown in FIG. 6, the edge member 130 is formed as a quadrangular frame corresponding to the window 151a. That is, the display unit 151 is accommodated in the edge member 130. As shown in FIG. 5, the edge member 130 is inserted into a space between the first case 101 (or the terminal body 104) and the display unit 151.

Figure 7:
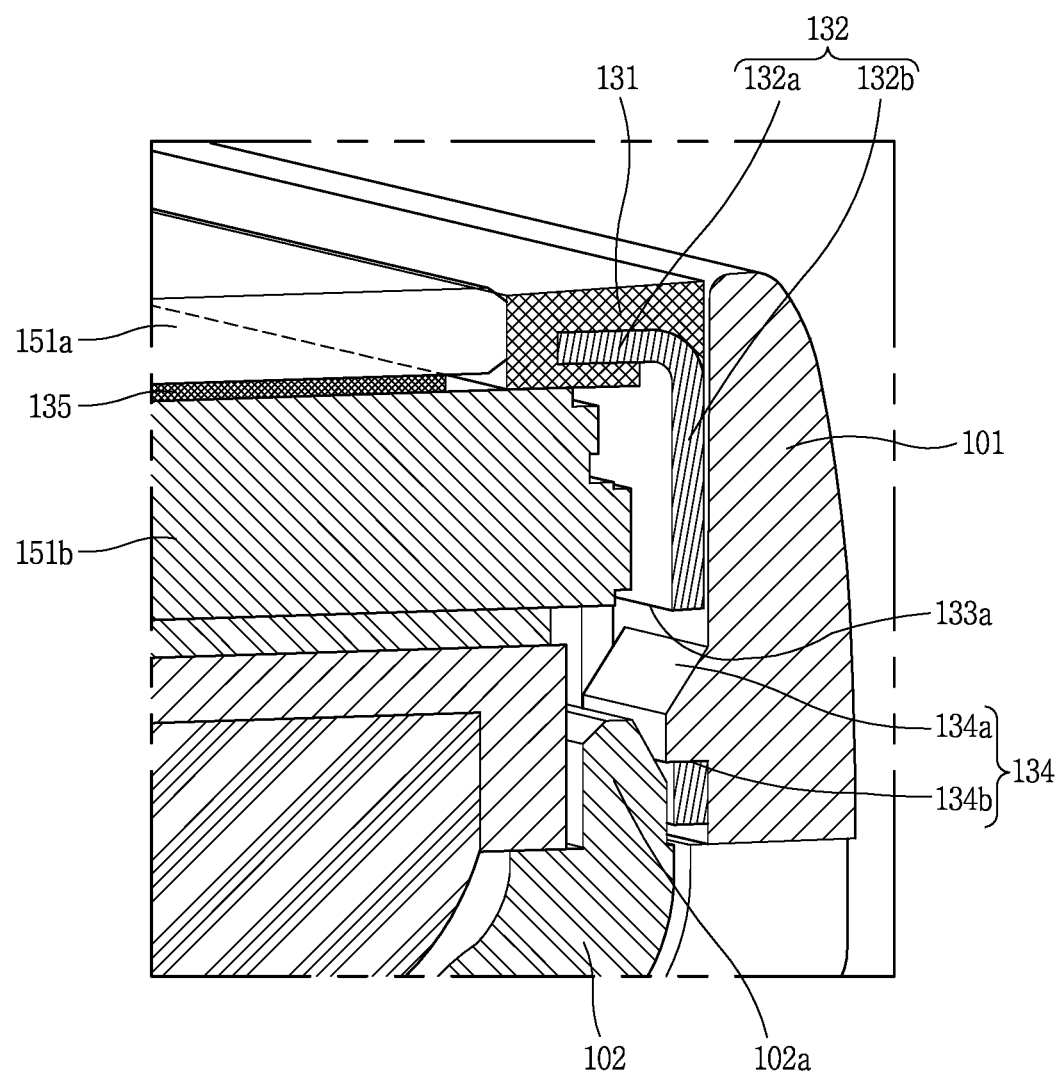
FIG. 7 is a cut-out perspective view of region 'A' in FIG. 5.

FIG. 7 is a cut-out perspective view of region 'A' in FIG. 5.

Referring to FIG. 7, the edge member 130 includes a rubber member 131 disposed between the window 151a and the first case 101, and exposed to the outside; and a metallic member 132 having an approximate 'L' shape, having one end inserted into the rubber member 131, and another end contacting an inner side surface of the first case 101. In an embodiment of the present invention, the metallic member 132 includes a horizontal portion 132a horizontally formed between the window 151a and the first case 101, and a vertical portion 132b formed to cross the horizontal portion 132a and contacting an inner side of the first case 101. In this case, the horizontal portion 132a and the vertical portion 132b may be perpendicular to each other.

In an embodiment of the present invention, the rubber member 131 is formed to enclose only the horizontal portion 132a of the metallic member 132. However, the present invention is not limited to this. That is, the rubber member 131 may be formed to enclose both the horizontal portion 132a and the vertical portion 132b of the metallic member 132. In this case, the rubber member 131 is composed of a horizontal portion and a vertical portion, thereby contacting an inner side surface of the first case 101.

A plurality of hooks 134 are protruded from an inner side surface of the first case 101 at preset intervals, toward the inside of the mobile terminal. Locking portions 133 locked by the hooks 134 are formed at a position corresponding to the hooks 134.

FIG. 7 is a cut-out perspective view the mobile terminal 100 including the hook 134. The locking portion 133 extends from the metallic member 132, and is formed to have a through hole 133a. The hook 134 includes an inclination portion 134a downward inclined from an inner side surface of the first case 101, and a horizontal portion 134b extending from the i inclination portion 134a and perpendicular to the inner side surface of the first case 101. In the case where the hook 134 includes the horizontal portion 134b, the through hole 133a may be formed to have a polygonal shape. In this case, one edge of the through hole 133a is locked by the horizontal portion 134b such that the edge member 130 is not separated from the first case 101.

Even if the locking portions 133 are locked by the hooks 134, if the metallic member 132 is inclined into the inside of the mobile terminal, the metallic member 132 may be separated from the hooks 134. In order to prevent this, the mobile terminal according to an embodiment of the present invention further includes the second case 102 covering a rear surface of the display unit 151 and at least partially provided in the first case 101, as shown in FIG. 7. Ribs 102a are protruded from an edge of the second case 102 at a position facing the hooks 134, toward a front surface of the mobile terminal. That is, since the metallic member 132 is locked by the ribs 102a, it is not separated from the hook 134. The third case 103 is provided on a rear surface of the first case 101 and the second case 102, and the battery 191 is provided in the third case 103.

FIG. 4 is an exploded perspective view of a mobile terminal according to an embodiment of the present invention.

Figure 11:
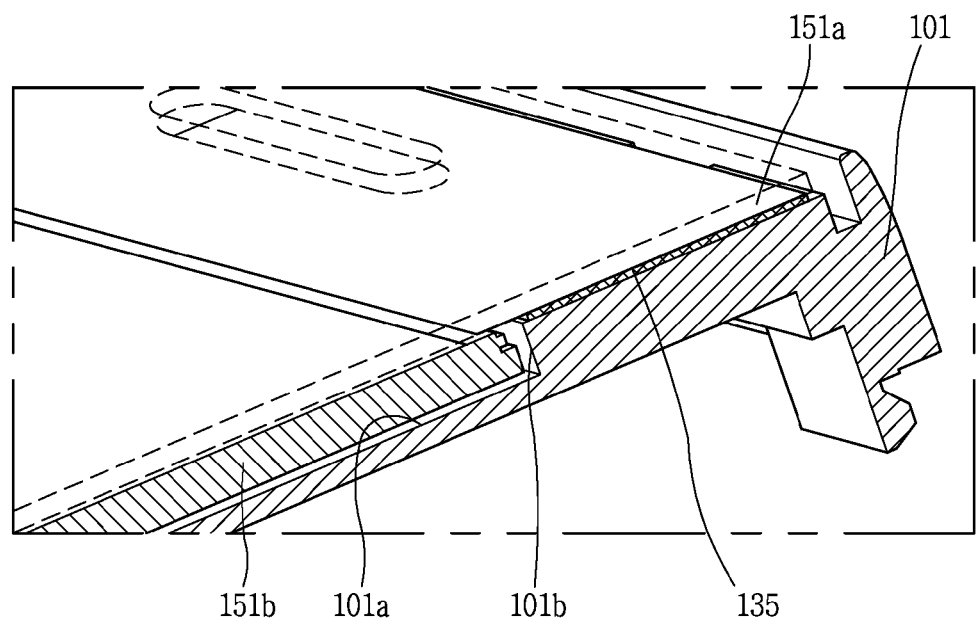
FIG. 11 is a perspective view of a first case, which is taken along line 'D-D' in FIG. 5.

Referring to FIG. 4, a supporting member 138 is provided on a rear surface of the display unit 151, and an adhering member 135 is provided on upper and lower ends of the supporting member 138. As shown in FIG. 11, the adhering member 135 is provided at an upper portion 101b of the first case 101, thereby allowing the window 151a to be attached to the first case 101.

The supporting member 138 may be a copper sheet, and serves to emit heat generated from the inside of the mobile terminal 100 to the outside. The display unit 151 and the supporting member 138 are accommodated in the first case 101, and a main printed circuit board (PCB) 181 is provided on a rear surface of the first case 101. And the second case 102 is formed to cover the main PCB 181. A through hole 102b is formed at the second case 102, and the battery 191 is mounted to pass through the through hole 102a. And the third case 103 is formed to cover the second case 102 and the battery 191.

Referring to FIG. 6, the edge member 130 may be formed to have a quadrangular ring shape, and the locking portions 133 are formed at preset intervals. The locking portions 133 are formed to correspond to the hooks 134 formed on the inner side surface of the first case 101.

Figure 9:
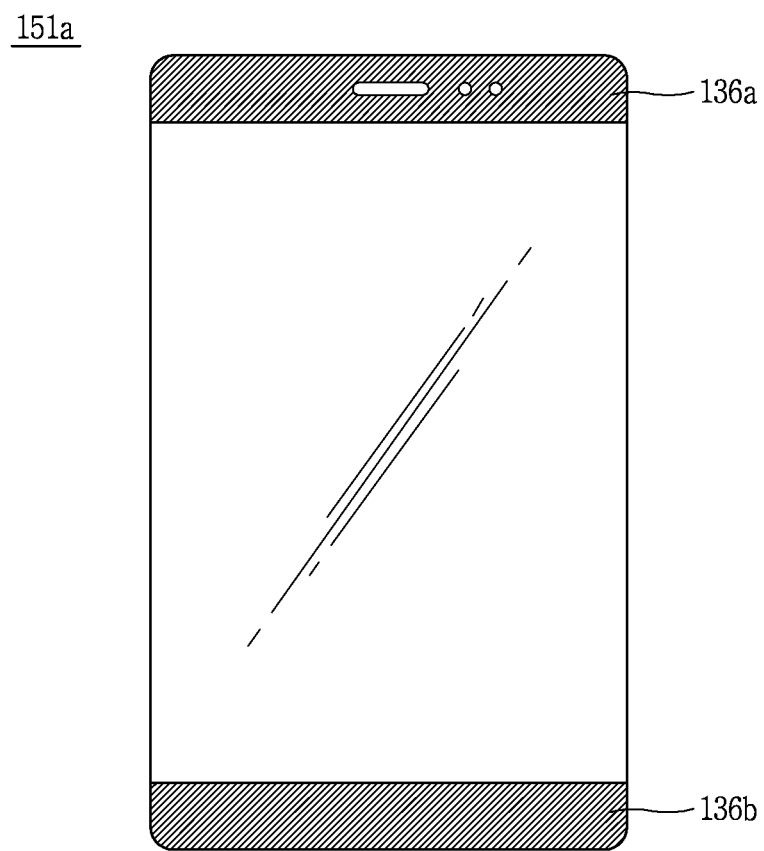
FIG. 9 is a rear view of a window according to an embodiment of the present invention.

FIG. 11 is a perspective view of the first case 101, which is taken along line 'D-D' in FIG. 5. Referring to FIG. 11, the first case 101 includes a recessed portion 101a recessed towards the inside of the mobile terminal at a middle region of the first case 101, and an upper portion 101b and a lower portion (not shown) formed at two sides of the recessed portion 101a and protruded more than the recessed portion 101a. The window 151a is attached to the upper portion 101b and the lower portion by the adhering member 135. That is, in an embodiment of the present invention, only upper and lower ends of the window 151a are coupled to the first case 101 by the adhering member 135, and right and left ends of the window 151a in a first direction do not contact the first case 101. The upper and lower ends are the same as printed regions 136a, 136b formed on a rear surface of the window 151a shown in FIG. 9. That is, the printed regions 136a, 136b of the window 151a are contact regions between the window 151a and the first case 101 in a second direction. That is, the printed regions 136a, 136b are formed on the rear surface of the window 151a, in correspondence to the adhering member 135.

Figure 8:
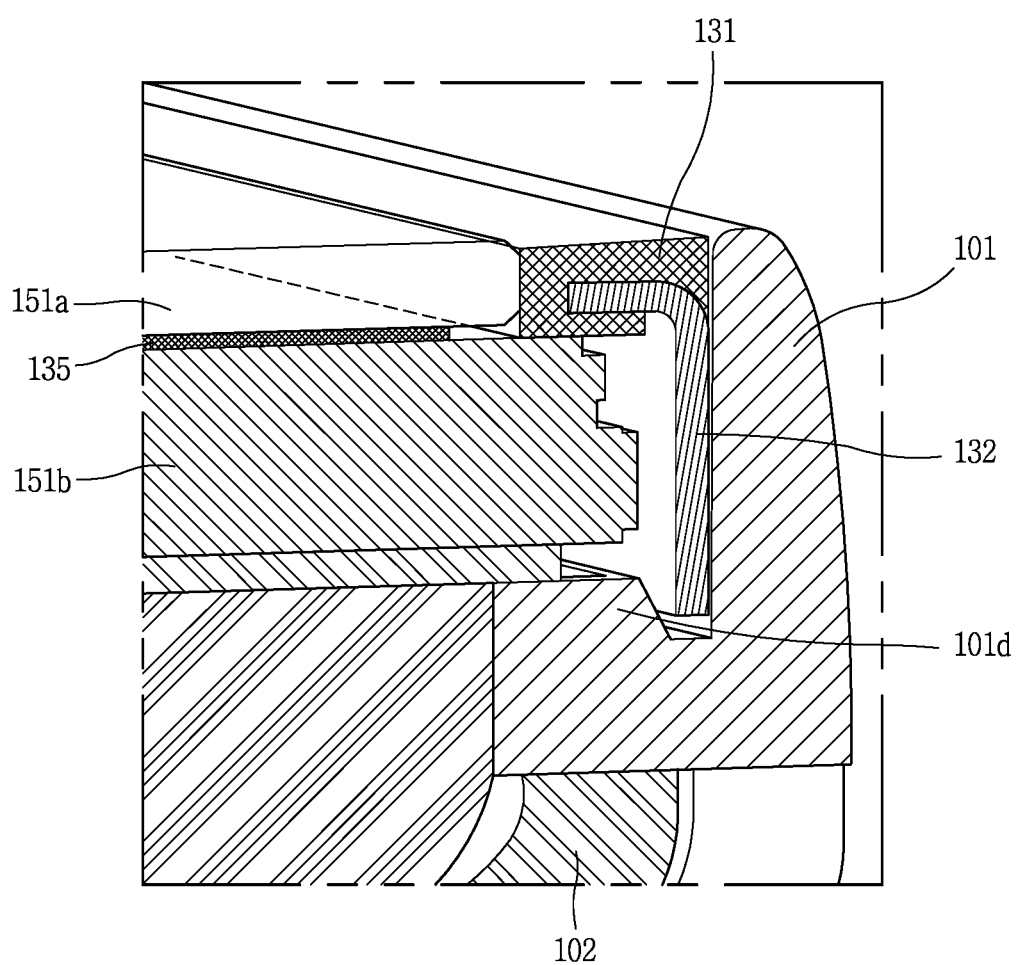
FIG. 8 is a cut-out perspective view of region 'B' in FIG. 5.
Figure 10:
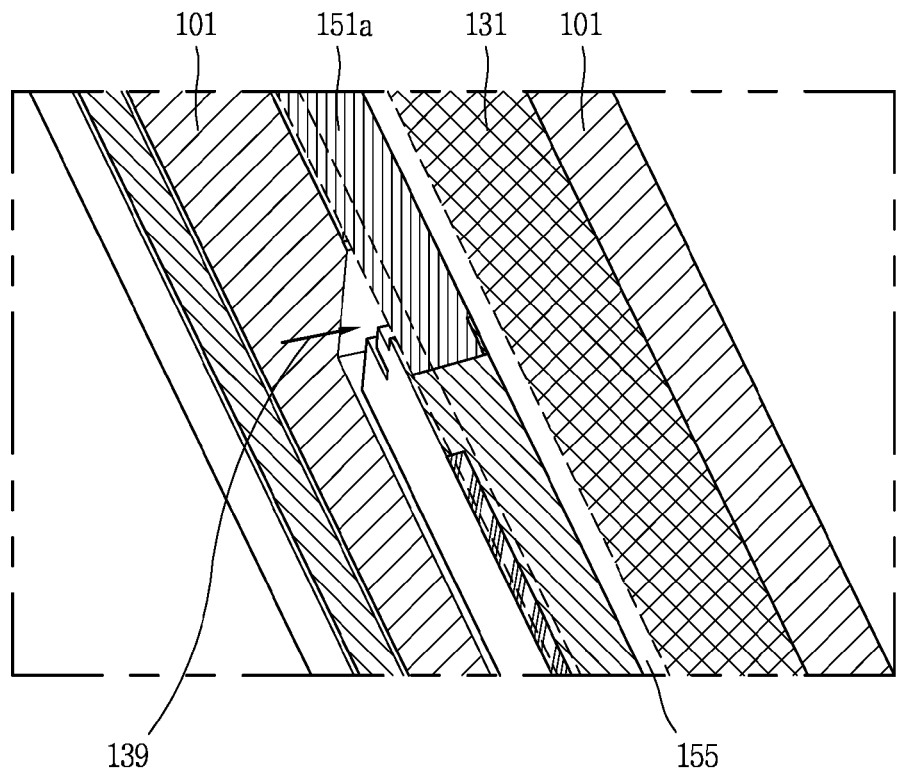
FIG. 10 is a cut-out perspective view taken along line 'C-C' in FIG. 5.
Figure 12A:
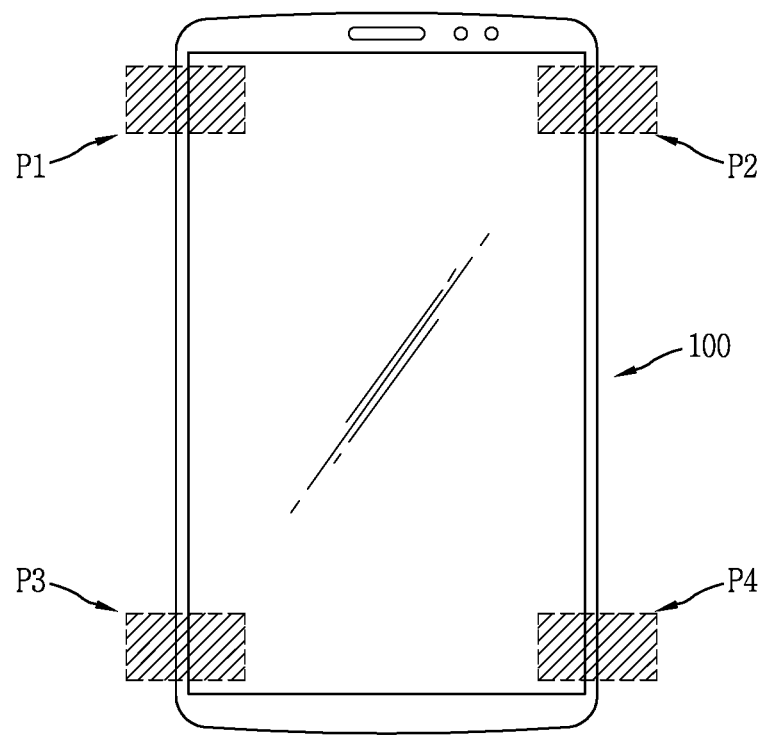
FIG. 12A is a view illustrating regions where light leakage occurs in a mobile terminal according to an embodiment of the present invention.

In an embodiment of the present invention, a chamfer 155 is formed at an edge of the window 151a. The chamfer 155 means a region formed as the end of the window 151a is partially bent for a smoothening process, which may have a planar surface of a curved surface. Shielding members 137a, 137b, 137c are formed between the LCD module 151b and the upper portion 101b of the first case 101, and between the LCD module 151b and the lower portion of the first case 101. FIG. 7 is a cut-out perspective view of region 'A' in FIG. 5, FIG. 8 is a cut-out perspective view of region 'B' in FIG. 5, and FIG. 10 is a cut-out perspective view taken along line 'C-C' in FIG. 5. Referring to FIGS. 7, 8 and 10, the edge of the window 151a is bent smoothly due to the chamfer 155. In the conventional art, a silk printed region 136 (refer to the left drawing of FIG. 12B) is formed only on a planar region of the window 151a. In the case where the chamfer 155 is formed at the edge of the window 151a, light of the LCD module 151b may leak to the outside through the chamfer 155. That is, as shown in FIG. 12A, light of the LCD module 151b may leak to the outside from four regions of the mobile terminal 100. The light leakage occurs mainly from two ends (upper and lower ends) of the LCD module 151b in a second direction. That is, the light leakage occurs mainly from two ends of each of upper and lower parts of the mobile terminal 100 (P1, P2, P3, P4). Light generated from the LCD module 151b is shielded between the LCD module 151b and the upper portion 101b of the first case 101, and between the LCD module 151b and the lower portion of the first case 101, due to the silk printed region 136. On the other hand, as shown in FIG. 10, light leakage occurs from the end of the LCD module 151b, a region where the chamfer 155 is formed along a light leakage path 139.

Figure 12B:
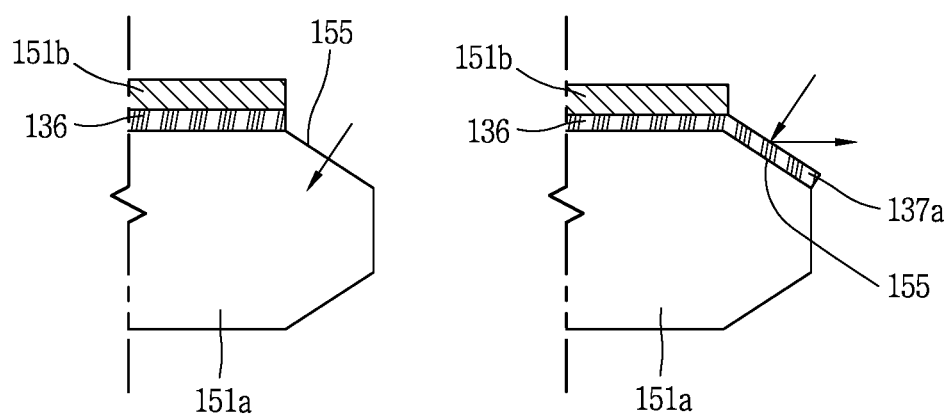
FIG. 12B is a view illustrating a printed pad formed at a chamfer of a window.
Figure 12C:
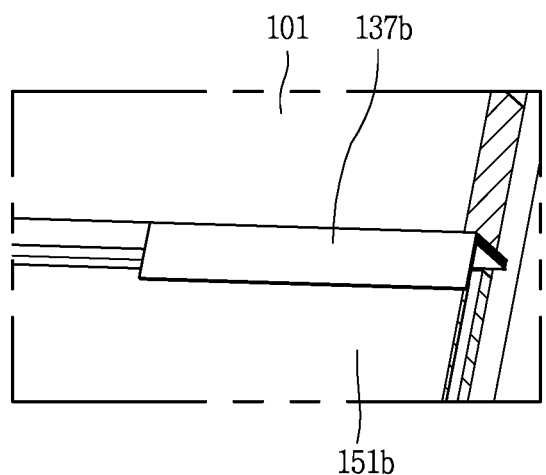
FIG. 12C is a view illustrating a process of forming a light shielding pad according to an embodiment of the present invention.
Figure 12D:
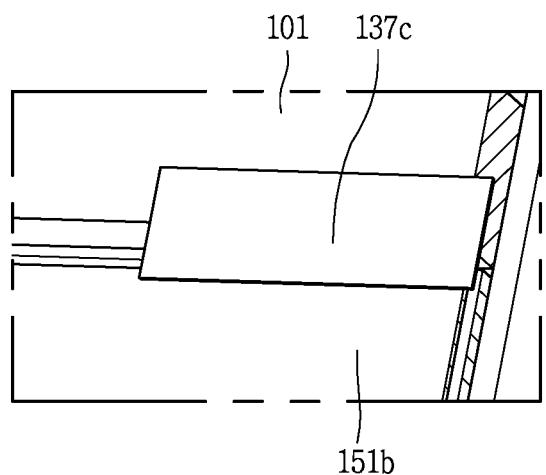
FIG. 12D is a view illustrating a process of forming a light shielding sheet according to an embodiment of the present invention.

In order to prevent such light leakage, in an embodiment of the present invention, as shown in FIG. 12B, a printed pad 137a may be formed at the chamfer 155 of the window 151a which contacts the LCD module 151b. The printed pad 137a may be formed through a rolling process using a sponge. That is, pad printing is executed on a planar surface of the rear surface of the window 151a and the chamfer 155, thereby preventing light generated from the LCD module 151b from leaking to the outside through the chamfer 155 after being reflected from the printing pad 137a, as indicated by the arrow of the right drawing of FIG. 12B. As shown in FIGS. 12C and 12D, may be used a light shielding pad 137b or a light shielding sheet 137c protruded more than the chamfer 155. That is, light leakage to a gap between the first case 101 and the display unit 151b may be prevented by the light shielding pad 137b or the light shielding sheet 137c.

FIG. 8 is a cut-out perspective view of region 'B' in FIG. 5, the part CB where the hooks 134 and the locking portions 133 according to an embodiment of the present invention have not been formed.

Referring to FIG. 8, the first case 101 is formed inwardly in the first direction, and a guide 101d is formed to be inclined to the outside in a direction of the metallic member 132. With such a structure, the edge member 130, especially the metallic member 132, is inserted into the mobile terminal with slidably contacting/non-contacting the guide 101*d*, without being locked by another structure.

Figure 13:
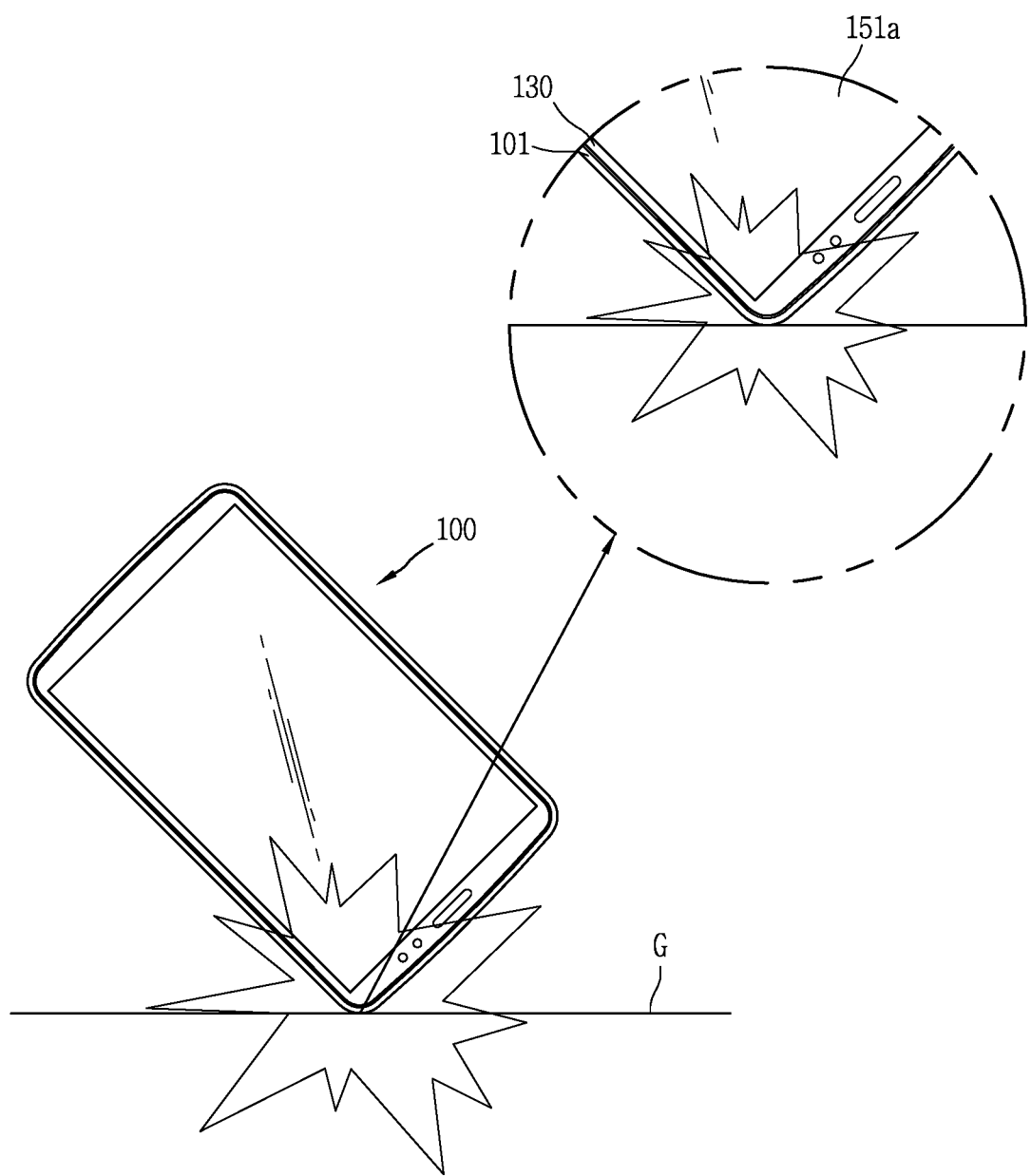
FIG. 13 is a view illustrating a dropped state of a mobile terminal according to an embodiment of the present invention.

FIG. 13 is a view illustrating a dropped state of the mobile terminal 100 according to an embodiment of the present invention.

In the embodiment of the present invention, a rubber member 131 is used to absorb a shock generated when the mobile terminal 100 is dropped on a ground surface (G) and to reduce a pressure applied to the window 151*a*. That is, the rubber member 131 is used to reduce a stress of the window 151*a*, and to reduce a load concentrated into a region where the LCD module 151*b* is fixed by using silicon.

FIGS. 14A to 15E are views illustrating assembling processes of the mobile terminal 100 according to embodiments of the present invention. More specifically, FIGS. 14A to 14D illustrate an assembling process of the mobile terminal 100 without using a jig 156, and FIGS. 15A to 15E illustrate an assembling process of the mobile terminal 100 by using the jig 156.

Figure 14A:
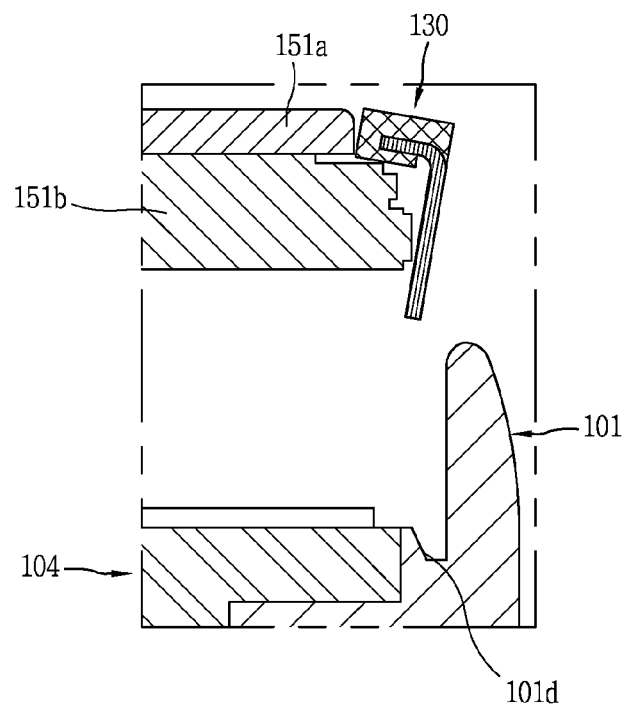
FIGS. 14A to 14D are views illustrating an assembling process of a mobile terminal according to an embodiment of the present invention.
Figure 14B:
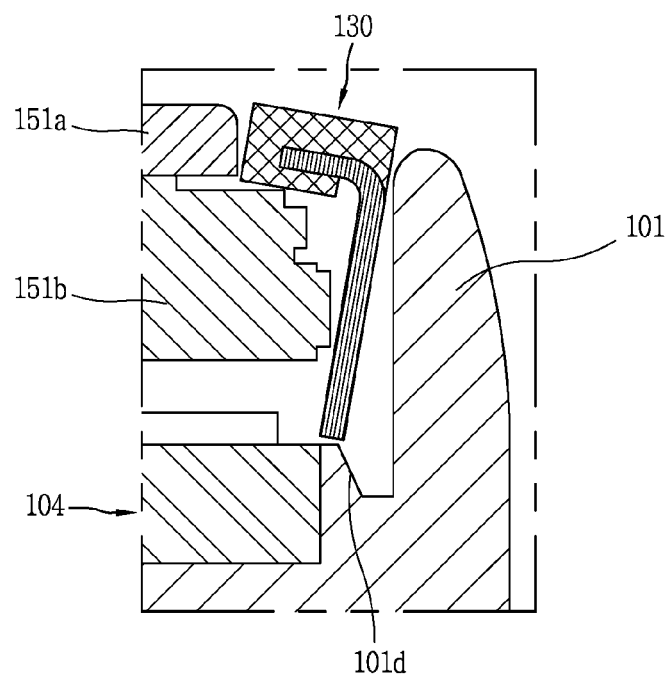
Figure 14C:
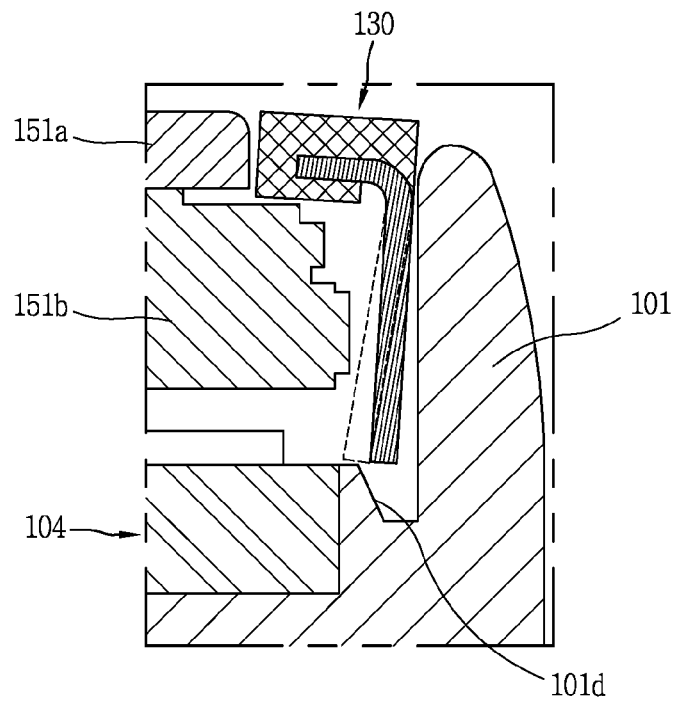
Figure 14D:
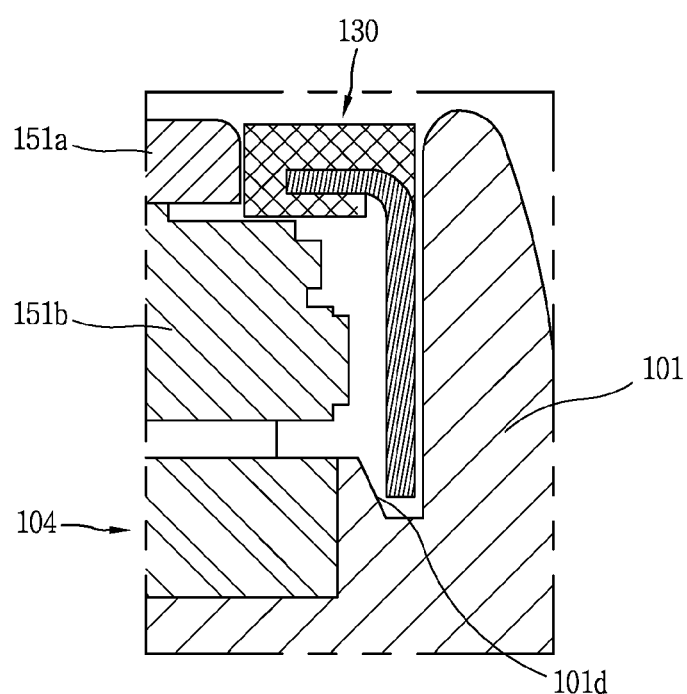

Referring to FIGS. 14A to 14D, the display unit 151 and the edge member 130 are simultaneously inserted into the terminal body 104 including the first case 101. FIG. 14A illustrates a state where the edge member 130 is formed on one side surface of the display unit 151, and FIG. 14B illustrates that one end of the edge member 130 is formed over the display unit 151 and a bent part of the edge member 130 is formed over the first case 101. FIG. 14C illustrates a process of inserting a lower end of the edge member 130, especially a lower end of the metallic member 132, into the terminal body 104 along the guide 101*d*. FIG. 14D illustrates an assembled state of the mobile terminal as the display unit 151 and the edge member have been mounted to the terminal body 104.

When the jig 156 is not used, the edge member 130 is firstly mounted to the display unit 151 (refer to FIG. 14A), and then is inserted into the terminal body 104. Since the edge member 130 has an approximate 'L' shape, its upper bent part firstly contacts the first case 101, and its lower part does not contact the first case 101 (refer to FIG. 14B). Then, as a lower end of the metallic member 132 is downward moved with slidably-contacting the guide 101*d* (refer to FIG. 14C), the vertical portion 132*b* of the metallic member 132 contacts the inner side surface of the first case 101. As a result, the edge member 130 is accommodated in the terminal body 104 (refer to FIG. 14D).

FIGS. 15A to 15E are views illustrating a process of coupling the edge member 130 to the terminal body 104 using the jig 156.

Figure 15A:
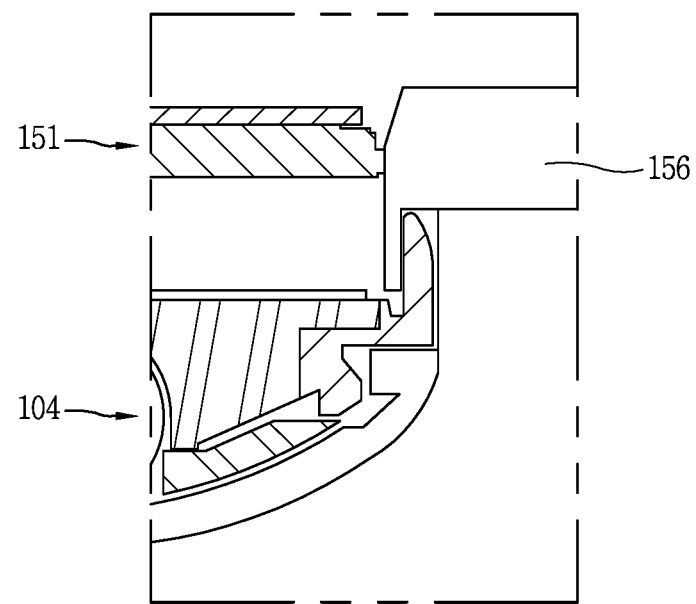
FIGS. 15A to 15E are views illustrating an assembling process of a mobile terminal according to an embodiment of the present invention.
Figure 15B:
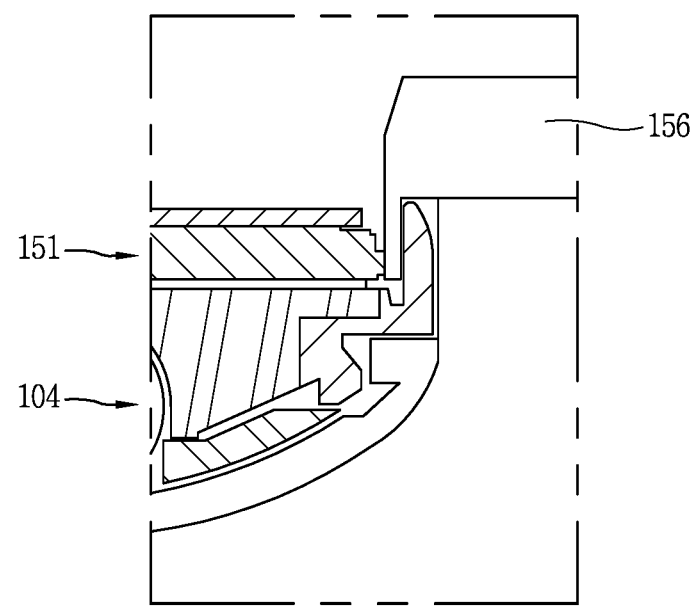
Figure 15C:
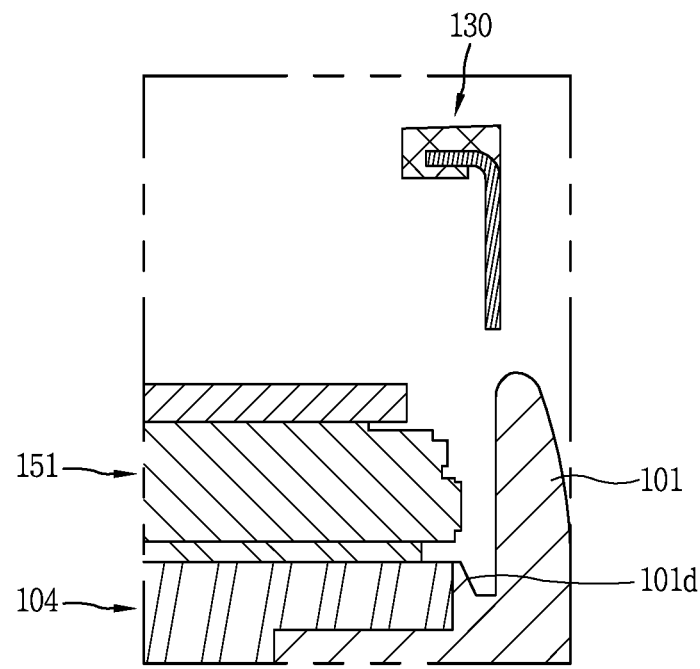

As shown in FIG. 15A, the jig 156 is installed at the terminal body 104 including the first case 101, and an end part of the display unit 151 is made to contact the jig 156. Then, as shown in FIG. 15B, the display unit 151 is downward moved with contacting the jig 156, thereby being mounted to the terminal body 104. In this case, a gap is formed between the display unit 151 and the first case 101, and the display unit 151 is coupled to the terminal body 104 by an adhering member or in a bonding manner. Then, as shown in FIG. 15C, the jig 156 is removed, and the edge member 130 is inserted into a space between the display unit 151 and the first case 101.

Figure 15D:
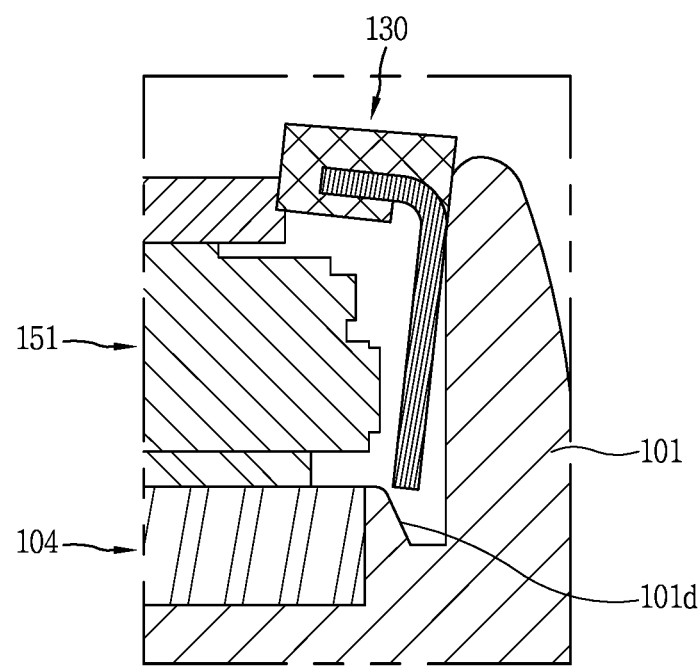
Figure 15E:
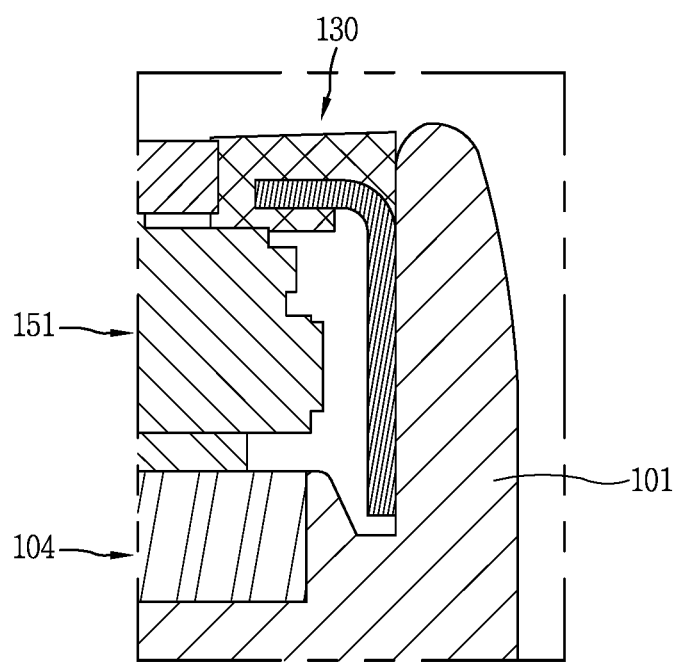

Then, as shown in FIGS. 15D and 15E, the edge member 130 is inserted into a space between the display unit 151 and the first case 101. FIG. 15D illustrates an inserted state of the edge member 130 into the terminal body 104 along the guide 101*d*, between the display unit 151 and the first case 101. FIG. 15E illustrates an assembled state of the mobile terminal 100 by an inserted state of the edge member 130.

As aforementioned, in an embodiment of the present invention, the LCD module 151*b* is exposed to the outside along a lateral direction of the window 151*a*. This is different from a general coupling process of the mobile terminal. For this, in an embodiment of the present invention, the edge member 130 is firstly mounted to the display unit 151, and then is mounted to the terminal body 104. Alternatively, as shown in FIGS. 15A to 15E, the display unit 151 is firstly mounted to the terminal body 104 by using the jig 156. Then, the edge member 130 is mounted to a space between the terminal body 104 and the display unit 151.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a display including:
a window; and
an LCD module located below the window, an upper surface of the LCD module facing the window;
a first case spaced from the display at a perimeter of the display, the first case being configured to support the display; and
an edge member disposed between the display and the first case, the edge member being located along an edge of the display,
wherein a length of the window in a first direction is smaller than the LCD module in the first direction such that at least a portion of the edge member contacts a side surface of the window, the upper surface of the LCD module, and an inner side surface of the first case.

2. The mobile terminal of claim 1, wherein the edge member includes:
a rubber member disposed between the window and the first case, the rubber member being exposed outside the mobile terminal; and
a metallic member having a first end located in the rubber member and a second end contacting the inner side surface of the first case.

3. The mobile terminal of claim 2, wherein a plurality of hooks are protruded from the inner side surface of the first case at preset intervals, each hook of the plurality of hooks extending toward an interior of the mobile terminal, and wherein the metallic member includes a plurality of locking portions, each locking portion of the plurality of locking portions being configured to engage a corresponding hook of the plurality of hooks to connect the edge member to the first case.

4. The mobile terminal of claim 3, wherein each hook of the plurality of hooks includes:
    an inclination portion inclined downward from the inner side surface of the first case toward the interior of the mobile terminal; and
    a horizontal portion extending from the inclination portion perpendicular to the inner side surface of the first case, and
    wherein each locking portion of the locking portions extends parallel to the inside surface of the case, and each locking portion of the locking portions includes a through hole to receive the corresponding hook of the plurality of hooks.

5. The mobile terminal of claim 4, further comprising a second case covering a rear surface of the display, the second case being at least partially located in the first case, the second case including a plurality of ribs protruding from an edge of the second case, each rib of the plurality of ribs being located at a position facing an adjacent hook of the plurality of hooks.

6. The mobile terminal of claim 5, wherein the plurality of ribs extends toward an upper surface of the mobile terminal.

7. The mobile terminal of claim 2, wherein the metallic member has an approximate 'L' shape.

8. The mobile terminal of claim 7, wherein the metallic member includes:
    a first portion having the first end, the first portion extending between the window and the first case; and
    a second portion having the second end, the second portion extending perpendicular to the first portion, the second portion contacting the inner side surface of the first case.

9. The mobile terminal of claim 2, wherein the first case includes a guide to receive the second end of the metallic member.

10. The mobile terminal of claim 9, wherein the guide includes an angled recess to receive the second end of the metallic member.

11. The mobile terminal of claim 1, wherein the edge member includes:
    a metallic member including:
        a first portion extending between the window and the first case; and
        a second portion extending perpendicular to the first portion and parallel to the inner side surface of the first case; and
    a rubber member enclosing both the first portion and the second portion of the metallic member, the rubber member contacting both the window and the inner side surface of the first case.

12. The mobile terminal of claim 1, wherein the edge member is located at a perimeter of the window to fill a gap between the window and the first case.

13. The mobile terminal of claim 1, wherein the first case includes:
    a top portion arranged in a second direction perpendicular to the first direction;
    a bottom portion arranged in the second direction; and
    a recessed portion at a middle portion of the first case, the recessed portion being recessed toward an interior of the mobile terminal, and the recessed portion being located between the top portion and the bottom portion, and
    wherein the window is attached to the top portion of the first case and the bottom portion of the first case by an adhesive.

14. The mobile terminal of claim 13, wherein a first printed region is located on a rear surface of the window opposite the top portion of the first case and a second printed region is located on the rear surface of the window opposite the bottom portion of the first case.

15. The mobile terminal of claim 13, wherein a chamfer is located at an edge of the window, and
    wherein light shielding members are located between the LCD module and the top portion of the first case, and between the LCD module and the bottom portion of the first case.

16. The mobile terminal of claim 15, wherein each light shielding member is a pad located at the chamfer of the window to contact the LCD module.

17. The mobile terminal of claim 15, wherein each light shielding member is a light shielding pad or a light shielding sheet that protrudes beyond the chamfer.

18. A method of assembling the mobile terminal of claim 1, the method comprising:
    inserting the display into the first case; and
    inserting the edge member into the first case to secure the display to the first case.

19. The method of claim 18, wherein the display and the edge member are simultaneously inserted into the first case.

20. The method of claim 18, further comprising:
    inserting a jig into the first case prior to inserting the display into the first case; and
    removing the jig from the first case after inserting the display, but prior to inserting the edge member into the first case.

* * * * *